United States Patent
Nakazato et al.

(10) Patent No.: US 12,284,062 B2
(45) Date of Patent: Apr. 22, 2025

(54) O-RU AND MANAGEMENT METHOD

(71) Applicant: RAKUTEN MOBILE, INC., Tokyo (JP)

(72) Inventors: Jin Nakazato, Tokyo (JP); Saki Tanaka, Tokyo (JP); Haruka Horiuchi, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/920,923

(22) PCT Filed: Dec. 24, 2021

(86) PCT No.: PCT/JP2021/048173
§ 371 (c)(1),
(2) Date: Oct. 24, 2022

(87) PCT Pub. No.: WO2023/119618
PCT Pub. Date: Jun. 29, 2023

(65) Prior Publication Data
US 2024/0223410 A1    Jul. 4, 2024

(51) Int. Cl.
*H04L 25/03* (2006.01)
*H04W 84/04* (2009.01)

(52) U.S. Cl.
CPC ..... *H04L 25/03847* (2013.01); *H04W 84/042* (2013.01)

(58) Field of Classification Search
CPC .......... H04L 25/03847; H04W 84/042; H04W 88/085; H04W 24/04; H04W 92/12
USPC ....................................................... 375/262
See application file for complete search history.

(56) References Cited

U.S. PATENT DOCUMENTS

2021/0007039 A1*  1/2021  Salahuddeen ....... H04L 12/1845
2021/0321390 A1  10/2021  Muta et al.
2022/0417876 A1* 12/2022  Ranson ............... H04W 56/001

FOREIGN PATENT DOCUMENTS

JP         2021-168445 A   10/2021
KR    10-2021-0061107 A    5/2021

OTHER PUBLICATIONS

"O-RAN.WG4.MP.0-v06.00 Technical Specification", O-RAN Alliance Working Group 4, Management Plan Specification, O-RAN Alliance e.V., Mar. 2021, pp. 1-205, https://www.o-ran.org/specifications.
International Search Report for PCT/JP2021/048173, dated Apr. 5, 2022.

* cited by examiner

*Primary Examiner* — Fitwi Y Hailegiorgis
(74) *Attorney, Agent, or Firm* — Sughrue Mion, PLLC

(57) ABSTRACT

An Open Radio Access Network Radio Unit (O-RU) including a Radio Frequency (RF) unit and a baseband unit, wherein: the baseband unit includes two or more digital signal processing units; the two or more digital signal processing units are configured to execute digital signal processing with respectively defined higher-level units; and the baseband unit is configured so as to be able to make some of the two or more digital signal processing units execute the digital signal processing and so as to be able to switch between the digital signal processing units that are made to execute the digital signal processing.

11 Claims, 12 Drawing Sheets

O-RU AND MANAGEMENT METHOD

CROSS REFERENCE TO RELATED APPLICATIONS

This application is a National Stage of International Application No. PCT/JP2021/048173 filed Dec. 24, 2021.

TECHNICAL FIELD

The present disclosure relates to an Open Radio Access Network Radio Unit (O-RU), an O-RU management method, and an O-RU management program.

BACKGROUND

The fronthaul specifications of the O-RAN Alliance pertain to links between Radio Units (RUs) and Distributed Units (DUs).

In baseband processing, Split Option 7-2x is employed, and some of the physical layer processing (low-PHY) is performed in O-RUs. For this reason, O-RUs include features for performing low-PHY processing in addition to Radio Frequency (RF) processing units including antennas.

Non-Patent Document 1 defines a management plane protocol used in a fronthaul interface linking O-RUs with O-DUs and the like.

Although Non-Patent Document 1 describes O-RU software management, particularly activation, no particular consideration is given regarding measures to be taken in the event of suspension of operation due to restarting or the like in association therewith.

CITATION LIST

Non-Patent Literature

Non-Patent Document 1: O-RAN.WG4.MP.0-v06.00 (March 2021) (https://www.o-ran.org/specifications)

SUMMARY OF INVENTION

Technical Problem

Since an O-RU is designed to communicably connect to one O-DU, if the O-DU to which an O-RU is communicably connected becomes inactive due to a malfunction or the like, then the results of baseband processing in the O-RU sometimes cannot be supplied to the O-DU.

Additionally, a series of operations for upgrading the baseband processing or the like in an O-RU may sometimes be included when restarting the O-RU. Restarting at the time of an upgrade can cause problems such as by affecting services associated with off-the-air periods, by increasing the cost in association with nighttime work, and the like.

An objective of the present disclosure is to provide an O-RU, an O-RU management method, and an O-RU management program for reducing the impact due to suspension of operation of the O-RU or of an O-DU.

Solution to Problem

One embodiment of the Open Radio Access Network Radio Unit (O-RU) according to the present disclosure includes a Radio Frequency (RF) unit and a baseband unit, wherein: the baseband unit includes two or more digital signal processing units; the two or more digital signal processing units are configured to execute digital signal processing with respectively defined higher-level units; and the baseband unit is configured so as to be able to make some of the two or more digital signal processing units execute the digital signal processing and so as to be able to switch between the digital signal processing units that are made to execute the digital signal processing.

The respective digital signal processing units may be kept in a state of being communicably connected to the respectively defined higher-level units.

The respective digital signal processing units may be connected to the same RF unit.

Even if the digital signal processing units that are made to execute the digital signal processing are switched, signals processed by the digital signal processing units may be transmitted and received by the same antenna.

A generation unit that generates the two or more digital signal processing units in the baseband unit may be further included.

The higher-level units may be Open Radio Access Network Distributed Units (O-DUs).

The digital signal processing units that the execute digital signal processing with the higher-level units may be configured to be selected based on at least configuration.

The digital signal processing units that execute the digital signal processing with the higher-level units may be configured to be switched by exclusive control between the digital signal processing units.

The digital signal processing units that execute the digital signal processing with the higher-level units may be configured to be switched upon receiving a switching command.

The respective digital signal processing units may be configured to operate by respectively corresponding digital signal processing programs, and the digital signal processing units that execute the digital signal processing with the higher-level units may be further configured to be switched based on at least a state of the digital signal processing programs.

One embodiment of the Open Radio Access Network Radio Unit (O-RU) management method according to the present disclosure includes: a process of generating, on a virtualization infrastructure of the O-RU, multiple digital signal processing units configured so as to execute digital signal processing with respectively defined higher-level units; a process of transitioning between states of the respective digital signal processing units so that the respective digital signal processing units are put in an operational state in which digital signal processing can be executed or in a rest state in which digital signal processing cannot be executed; initiating a radio communication process of the O-RU by a first digital signal processing unit that is in the operational state among the multiple digital signal processing units; receiving a state switching signal in the O-RU; switching between the operational state and the rest state in the first digital signal processing unit, which responded to the reception of the state switching signal; switching between the operational state and the rest state in a second digital signal processing unit that is in the rest state and that is different from the first digital signal processing unit, among multiple digital signal processing units, which responded to the reception of the state switching signal; and initiating a radio communication process of the O-RU by the second digital signal processing unit that is in the operational state among the multiple digital signal processing units.

BRIEF DESCRIPTION OF DRAWINGS

FIG. 4A is a diagram illustrating a hierarchical model. FIG. 4B is a diagram illustrating a hybrid model.

DESCRIPTION OF EMBODIMENTS

Hereinafter, a mode for carrying out the subject matter of the present disclosure will be explained in detail with reference to the drawings.

Figure 1:
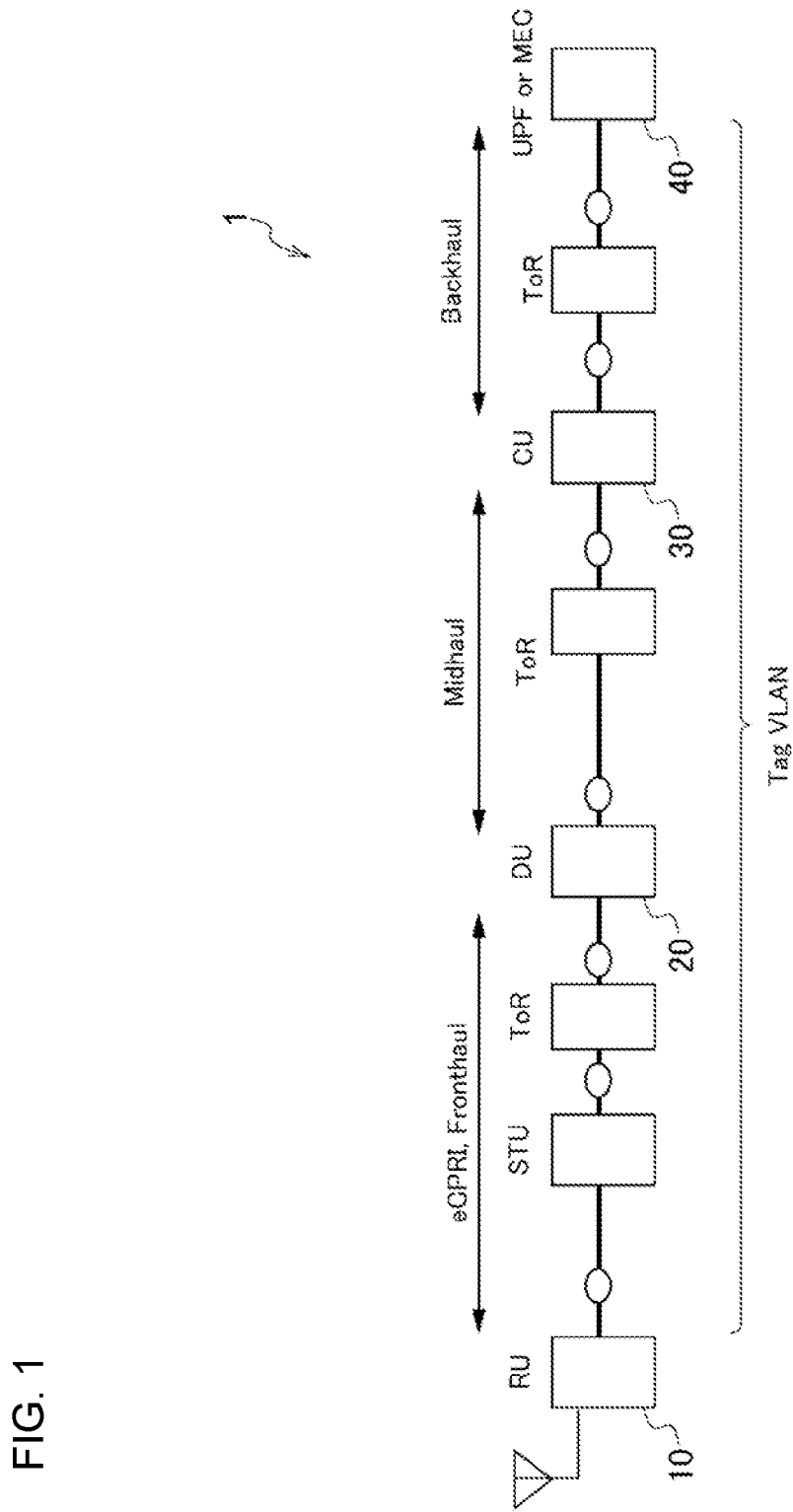
FIG. 1 is a diagram illustrating an example of a radio access network to which the O-RU and the O-RU management method according to an embodiment in the present disclosure are applied.

FIG. 1 is a diagram illustrating an example of a radio access network (RAN) to which the O-RU and the O-RU management method according to an embodiment in the present disclosure are applied.

In FIG. 1, a radio access network 1 comprises a Radio Unit (RU) 10, a Distributed Unit (DU) 20, and a Centralized Unit (CU) 30. The radio access network 1 is a network that performs radio communication with radio terminals (UEs), and as mentioned below, the functions for performing radio communication, i.e., the functions as a so-called base station, are divided between the RU 10, the DU 20, and the CU 30.

As mentioned below, the RU 10 and the DU 20 may respectively be an O-RU 10 and an O-DU 20.

Furthermore, aside from the RU 10, the DU 20, and the CU 30, the radio access network 1 may also include, for example, a Mobile Edge Computing (MEC) server or a User Plane Function (UPF), as illustrated in FIG. 1.

Furthermore, in the radio access network 1, at least the RU 10, the DU 20, and the CU 30 are communicably connected, by radio or by cable, via switches in a router or the like, to form a virtual LAN (VLAN). The virtual LAN may, in particular, be a Tag VLAN.

The connection between the RU 10 and the DU 20 in the radio access network 1 is referred to as the fronthaul, and enhanced Common Public Radio Interface (eCPRI) is used as the fronthaul protocol.

Figure 2:
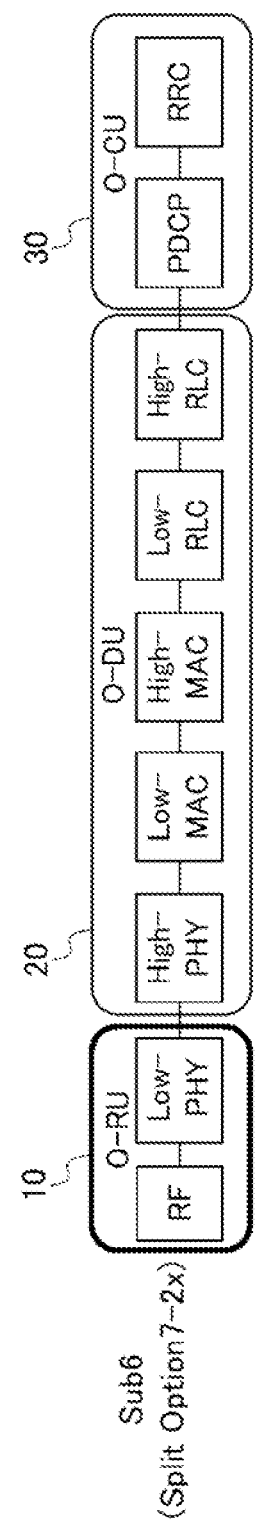
FIG. 2 is a diagram illustrating an O-RAN fronthaul.

FIG. 2 is a diagram illustrating an O-RAN fronthaul.

The RU (O-RU) 10 and the DU (O-DU) 20 that are compliant with the O-RAN fronthaul specifications will be explained with reference to FIG. 2. Under the O-RAN fronthaul specifications, Split Option 7-2x is employed in the 3.7 GHz and 4.5 GHz frequency bands (Sub6 bands).

In the O-RU 10, which is compliant with Split Option 7-2x, some of the physical layer digital signal processing (low-PHY) is performed in addition to analog signal processing (RF) such as D/A conversion or A/D conversion, analog beam forming, and the like. In the O-DU 20, the remaining physical layer digital signal processing (high-PHY), and MAC layer and radio link layer processing are performed.

Figure 3:
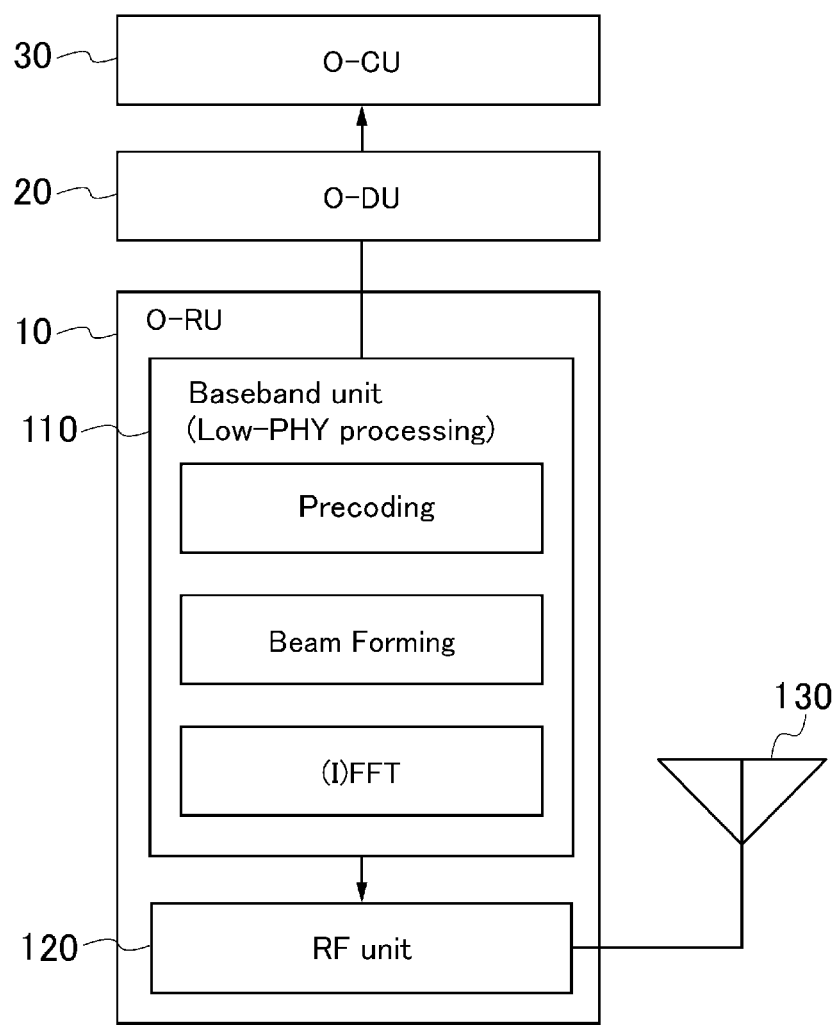
FIG. 3 is a schematic diagram illustrating the configuration of a common O-RU.

FIG. 3 is a schematic diagram illustrating the configuration of a common O-RU.

The common O-RU 10 will be described in further detail with reference to FIG. 3.

The O-RU 10 includes a baseband unit 110 for performing low-PHY processing and an RF unit 120 for performing analog signal processing. Furthermore, the RF unit 120 communicably connects with an antenna 130 and exchanges radio wave signals with radio terminals (UEs). Furthermore, the O-RU 10 is communicably connected with the O-DU 20.

In the O-RU 10, which is compliant with Split Option 7-2x, some of the physical layer digital signal processing, which is generally referred to as low-PHY processing, is performed in the baseband unit 110. Low-PHY processing includes, for example, precoding, beam forming, fast Fourier transforms (FFTs) and inverse fast Fourier transforms (IFFTs).

On the downlink, the digital signals processed in the O-DU 20 are sent to the O-RU 10 and low-PHY processing is executed. Additionally, on the uplink, the results of the low-PHY processing executed by the O-RU 10 are sent to the O-DU 20.

The O-DU 20 may be configured by means of a Virtual Machine (VM) using virtualization technology. In other words, the O-DU 20 may be configured as a Virtual Network Function (VNF) on Network Functions Virtualization Infrastructure (NFVI). An O-CU 30 may also be configured by means of a VM using virtualization technology.

Additionally, in FIG. 3, the O-RU 10 is communicably connected to one O-DU 20. However, as mentioned below, the number of O-DUs that are communicably connected to the O-RU 10 is not limited to one.

Furthermore, one or more Network Management Systems (NMSs) may communicably connect with the O-RU 10 to control the O-RU 10. Hereinafter, the O-DUs and the NMSs will be referred to collectively as "higher-level units".

Figure 4:
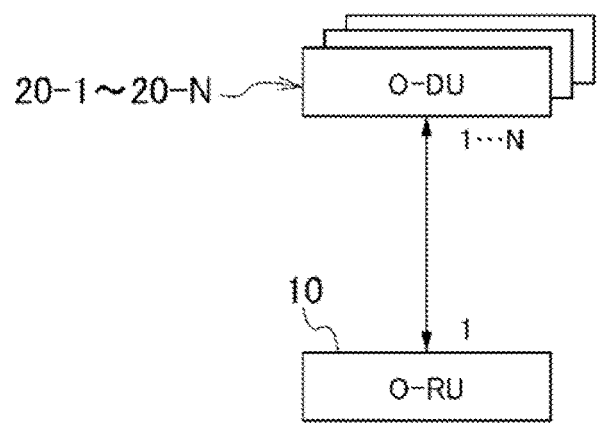
FIG. 4 is a schematic diagram illustrating a connection between O-DUs and an O-RU.
Figure 4:
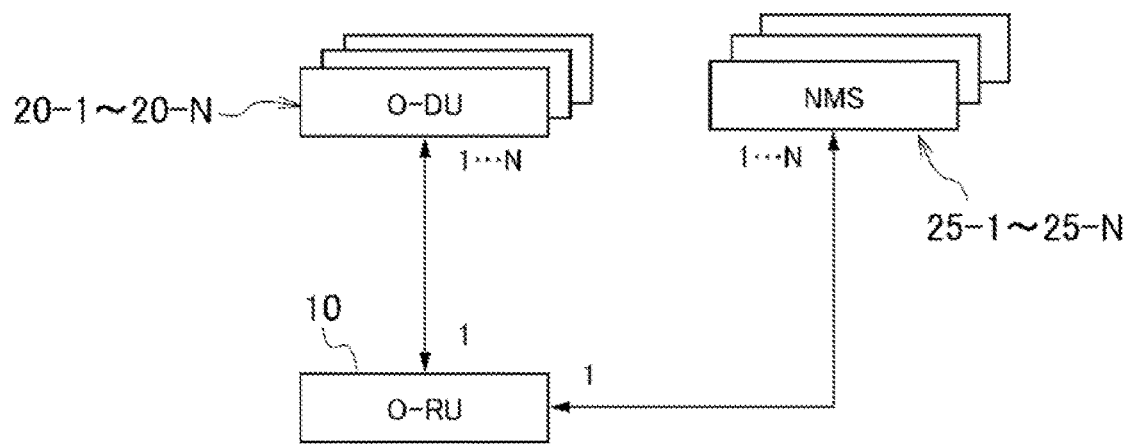

FIG. 4 is a schematic diagram illustrating a connection between the O-DUs and the O-RU.

A connection mode supported by the Management Plane (M-Plane) will be explained with reference to FIG. 4.

FIG. 4A is a diagram illustrating a Hierarchical model, indicating that N (N being equal to or greater than 1) O-DUs (O-DU 20-1 to O-DU 20-N) are communicably connected to the O-RU 10. That is, in the Hierarchical model in FIG. 4A, the N O-DUs (O-DU 20-1 to O-DU 20-N) are higher-level units.

FIG. 4B is a diagram illustrating a Hybrid model, indicating that N (N being equal to or greater than 1) O-DUs (O-DU 20-1 to O-DU 20-N) and N NMSs (NMS 25-1 to NMS 25-N) are communicably connected to the O-RU 10. That is, in the Hybrid model, the O-DUs (O-DU 20-1 to O-DU 20-N) and the NMSs (NMS 25-1 to NMS 25-N) correspond to higher-level units.

Figure 5:
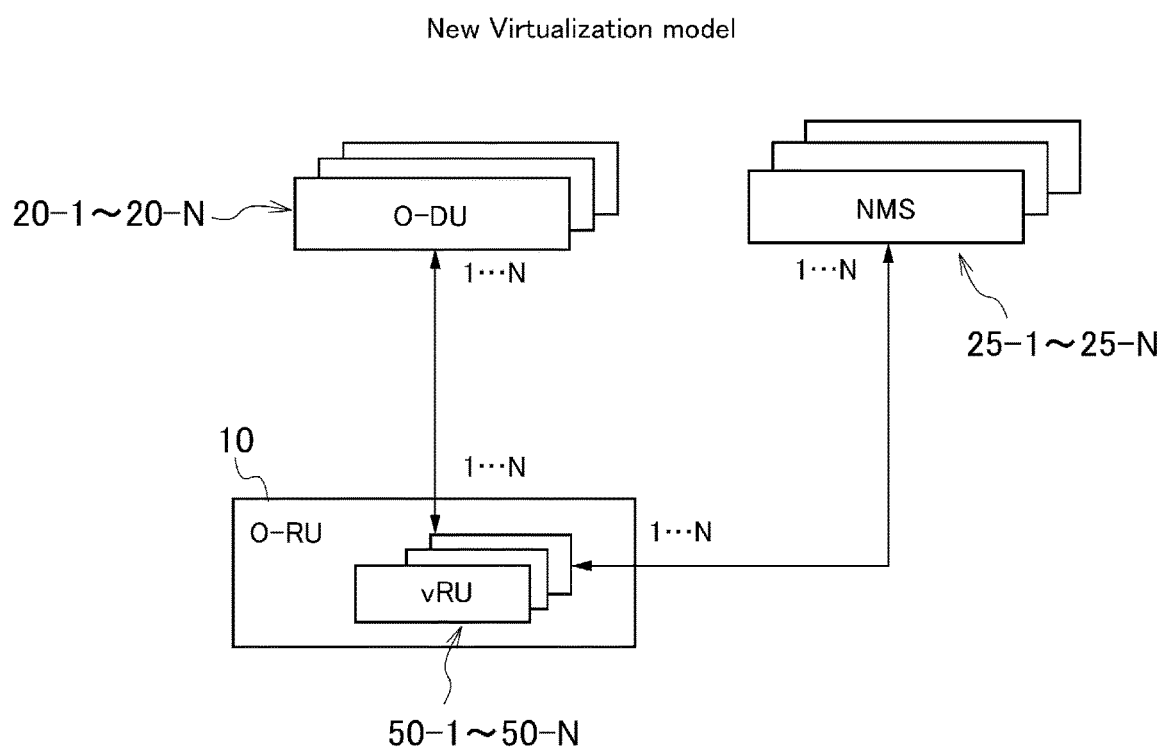
FIG. 5 is a schematic diagram illustrating an example of a connection between an O-RU and higher-level units according to an embodiment in the present disclosure.

FIG. 5 is a schematic diagram illustrating an example of a connection between an O-RU and higher-level units according to an embodiment in the present disclosure. Hereinafter, this connection mode will be referred to as a New Virtualization model.

The baseband unit 110 in the O-RU 10 can be configured by means of a Virtual Machine (VM) using virtualization technology. This virtualized baseband unit will be referred to, in the present description, as a "digital signal processing unit" or a vRU.

In particular, in the New Virtualization model, N (N being equal to or greater than 1) vRUs (vRU 50-1 to vRU 50-N) are configured in a single O-RU 10 by means of virtualization. In this case, N is equal to or greater than 1, and in particular, N may be equal to or greater than 2, so that multiple vRUs (vRU 50-1 to vRU 50-N) can be configured in a single O-RU 10. Furthermore, these N vRUs (vRU 50-1 to vRU 50-N) are communicably connected to N respectively corresponding O-DUs (O-DU 20-1 to O-DU 20-N).

Furthermore, the N (N being equal to or greater than 1) vRUs (vRU 50-1 to vRU 50-N) may communicably connect to N respectively corresponding NMSs (NMS 25-1 to NMS 25-N).

In the New Virtualization model, the higher-level units are the O-DUs (O-DU 20-1 to O-DU 20-N) or the NMSs (NMS 25-1 to NMS 25-N).

Hereinafter, N may be defined as an integer equal to or greater than 1, and the alternate names vRU #1 to vRU #N may be used for the N vRUs (vRU 50-1 to vRU 50-N). Additionally, the alternate names O-DU #1 to O-DU #N may be used for the N O-DUs (O-DU 20-1 to O-DU 20-N).

Note that, although N O-DUs 20, N NMSs 25, and N vRUs 50 are mentioned above, said description does not mean that there are always the same number of O-DUs 20, NMSs 25, and vRUs 50. N is an arbitrary integer, and the value of N when representing the number of O-DUs 20, the value of N when representing the number of NMSs 25, and the value of N when representing the number of vRUs 50 may be different. That is, the numbers of the O-DUs 20, the NMSs 25, and the vRUs 50 may be different.

Figure 6:
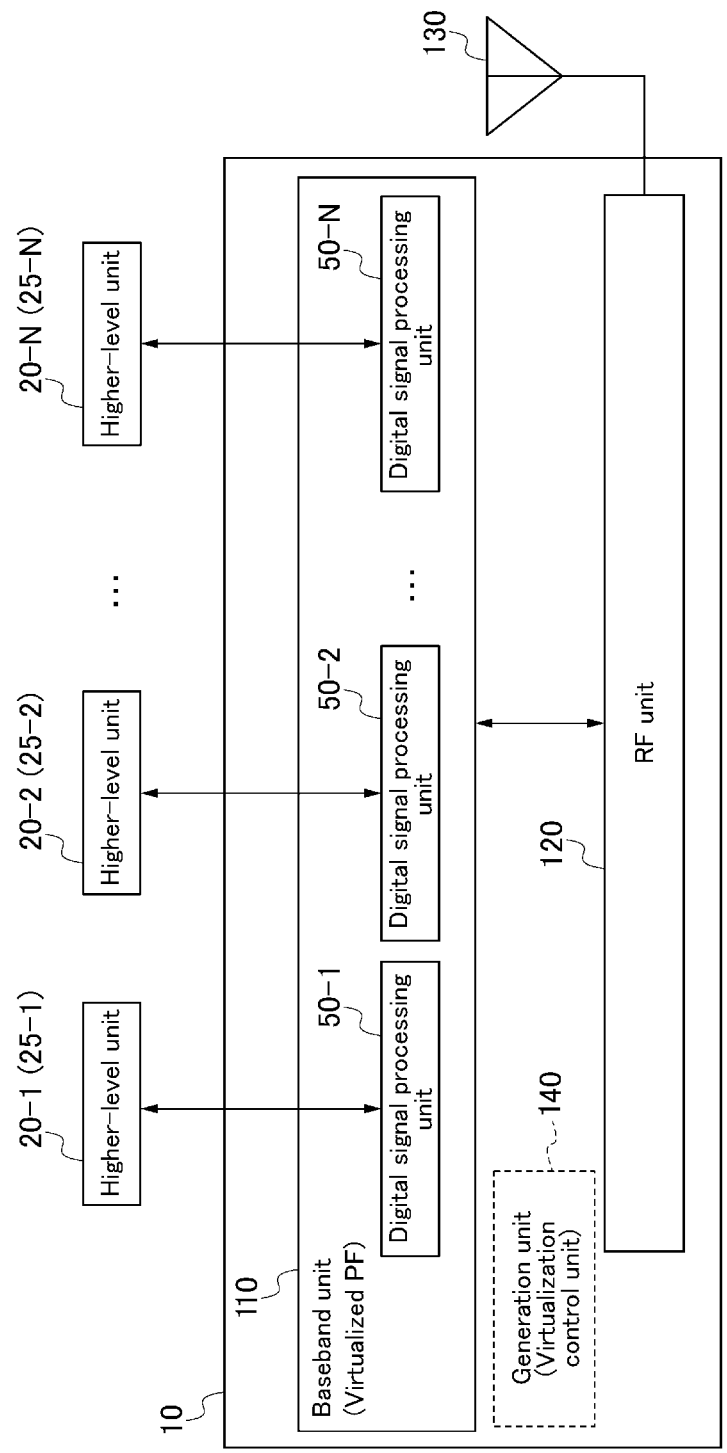
FIG. 6 is a schematic diagram illustrating the configuration of an O-RU according to an embodiment in the present disclosure.

FIG. 6 is a schematic diagram illustrating the configuration of the O-RU 10 according to an embodiment in the present disclosure. The O-RU 10 includes a baseband unit 110 for performing digital signal processing and an RF unit 120 for performing analog signal processing. Furthermore, the RF unit 120 is connected to the antenna unit 130.

Note that the number of RF units 120 and the number of antennas 130 are not limited to one, and there may be an arbitrary number, equal to or greater than one, of each.

Furthermore, the O-RU 10 has been described as being compliant with Split Option 7-2x and the digital signal processing in the baseband unit 110 has been described as low-PHY processing. However, it should be noted that the O-RU 10 is not limited to being compliant with Split Option 7-2x and merely needs to be compliant with O-RAN fronthaul specifications. Additionally, the digital signal processing in the baseband unit 110 is not limited to being low-PHY processing.

As mentioned above, the baseband unit 110 can be configured by means of a VM using virtualization technology. The N (N being equal to or greater than 1) virtualized baseband units are the digital processing units (vRU 50-1 to vRU 50-N).

Furthermore, the N digital signal processing units (vRU 50-1 to vRU 50-N) are communicably connected with M (M being equal to or greater than 1 and equal to or less than N) respectively corresponding higher-level units (O-DU 20-1 to O-DU 20-M or NMS 25-1 to NMS 25-M).

In other words, the N (N being equal to or greater than 1) digital signal processing units (vRU 50-1 to vRU 50-N) may connect with N respectively different O-DUs, namely, the O-DU 20-1 to the O-DU 20-N.

Alternatively, at least some of the O-DUs to which the N (N being equal to or greater than 2) respective digital signal processing units (vRU 50-1 to vRU 50-N) are communicably connected may overlap and may therefore be the same. Thus, the number M of O-DUs to which the N (N being equal to or greater than 2) digital signal processing units (vRU 50-1 to vRU 50-N) connect may be smaller than N.

The same applies to the NMSs, and the N (N being equal to or greater than 1) digital signal processing units (vRU 50-1 to vRU 50-N) may connect with N respectively different NMSs, namely the NMS 25-1 to the NMS 25-N. Alternatively, at least some of the NMSs to which the N (N being equal to or greater than 2) respective digital signal processing units (vRU 50-1 to vRU 50-N) are communicably connected may overlap and may therefore be the same. Thus, the number M of NMSs to which the N (N being equal to or greater than 2) digital signal processing units (vRU 50-1 to vRU 50-N) connect may be smaller than N.

The N (N being equal to or greater than 1) digital signal processing units (vRU 50-1 to vRU 50-N) may connect to the same RF unit 120.

Furthermore, the same antenna 130 may be shared by the N (N being equal to or greater than 1) digital signal processing units (vRU 50-1 to vRU 50-N).

The baseband unit 110 may be configured as a virtualization infrastructure by means of an information processing device, and the N (N being equal to or greater than 1) digital signal processing units (vRU 50-1 to vRU 50-N) may be installed, as software, on the information processing device.

In particular, the baseband unit 110 may include a Programmable Logic Device (PLD) or a Field-Programmable Gate Array (FPGA), and the N (N being equal to or greater than 1) digital signal processing units (vRU 50-1 to vRU 50-N) may be installed, as firmware, on the PLD or the FPGA.

Furthermore, the N (N being equal to or greater than 1) digital signal processing units (vRU 50-1 to vRU 50-N) may be generated by a virtualization control unit 140. For this reason, the virtualization control unit 140 is referred to, in particular, as a generation unit 140.

A person skilled in the art would understand that the O-RU 10 could include components and the like that are omitted from FIG. 6.

Figure 7:
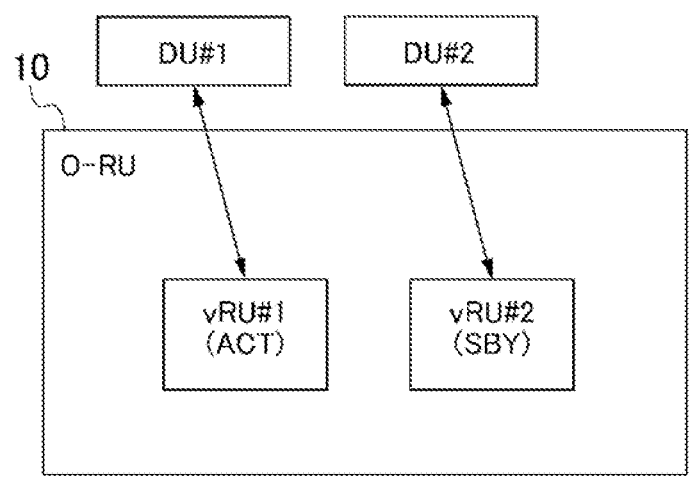
FIG. 7 is a schematic diagram for explaining the operations in an O-RU according to an embodiment in the present disclosure.

FIG. 7 is a schematic diagram for explaining the operations in the O-RU according to an embodiment in the present disclosure.

An example of the operations in the O-RU according to the embodiment will be explained with reference to FIG. 7. The O-RU 10 includes two virtualized digital signal processing units (vRU #1 and vRU #2). These two vRUs, namely, the vRU #1 and the vRU #2, are communicably connected to respectively corresponding higher-level units, namely, the DU #1 and the DU #2.

In this case, of the two vRUs, the vRU #1 is in an operational state (ACT) and the vRU #2 is in a rest state (SBY). That is, the vRU #1 is communicably connected with the DU #1 and performs digital signal processing such as low-PHY processing. In contrast therewith, the vRU #2 does not perform digital signal processing such as low-PHY processing.

In other words, a downlink signal from the DU #1 is transmitted to the vRU #1, which is in the operational state. The vRU #1 further performs digital signal processing, such as low-PHY processing, on that signal, and the signal is supplied to the RF unit 120 (FIG. 6), which performs analog signal processing, and further from the antenna 130 (FIG. 6) to a radio terminal (UE) or the like.

Additionally, an uplink signal supplied from the radio terminal to the antenna 130 by means of radio waves is subjected to analog signal processing in the RF unit 120, and is then subjected to digital signal processing, such as low-PHY processing, in the vRU #1, which is in the operational state. Furthermore, in the vRU #1, the signal that has been subjected to digital signal processing is transmitted to the DU #1 and further processed.

In contrast therewith, the vRU #2, which is in the rest state (SBY), may be communicably connected with the DU #2, yet may not perform digital signal processing such as low-PHY processing. In that case, the results of digital signal processing in the vRU #2 can be supplied to the DU #2 without performing a procedure for establishing a connection between the vRU #2 and the DU #2. Additionally, signals supplied from the DU #2 can be subjected to digital signal processing. Thus, it is possible to switch the digital signal processing from the rest state to the operational state more quickly. Therefore, the rest state of being communicably connected to a higher-level DU without performing digital signal processing such as low-PHY processing can be considered to be a hot standby (hot-SBY) state.

Meanwhile, the vRU #2, which is in the rest state (SBY), may be in a state of not being communicably connected with the DU #2 and not performing digital signal processing such as low-PHY processing. In this case, in order to switch the vRU #2 from the rest state to the operational state, the vRU #2 must be made to perform digital signal processing and to perform a procedure for establishing a connection between the vRU #2 and the DU #2. Therefore, the rest state of not being communicably connected to a higher-level DU and not performing digital signal processing such as low-PHY processing can be considered to be a cold standby (cold-SBY) state.

In other words, if the rest state in the vRU #2 is a hot standby state and a downlink signal from the DU #2 is transmitted to the vRU #2, which is in the rest state, then that signal will not be subjected to further digital signal processing by the vRU #2, supplied to the RF unit 120 that performs analog signal processing, and further supplied from the antenna 130 to the radio terminal (UE) or the like.

Additionally, if the rest state in the vRU #2 is a hot standby state and the DU #2 is in a state of receiving an uplink signal from the vRU #2, then the uplink signal will not actually be transmitted from the vRU #2, which is in the rest state, to the DU #2.

When the rest state in the vRU #2 is the cold standby state, in addition to putting the digital signal processing in the vRU #2 in an operational state, a connection must further be established between the vRU #2 and the DU #2.

Furthermore, although FIG. 7 indicates that the vRU #1 is in the operational state (ACT) and that the vRU #2 is in the rest state (SBY), each of these vRUs can be switched between the operational state and the rest state.

For example, when the vRU #1 is switched from the operational state to the rest state and the vRU #2 is switched from the rest state to the operational state, then among multiple RF units 120, the same RF unit 120 as the RF unit 120 that was being used by the vRU #1 can then be used by the vRU #2.

Additionally, regarding the antenna 130 as well, the same antenna as the antenna that was connected to the vRU #1 can be connected to the vRU 2.

In other words, even if the digital signal processing unit that executes the digital signal processing is switched between the vRU #1 and the vRU #2, the signals being processed by the digital signal processing unit of the vRU #1 or the vRU #2 can be transmitted and received by the same antenna.

The switching of the respective vRUs between the operational state and the rest state can be performed by various procedures.

Hereinafter, the switching of the respective vRUs between the operational state and the rest state by means of three methods in particular, namely, (1) exclusive control, (2) control by switching commands, and (3) mutual control, will be briefly explained.

(1) Exclusive Control

The operational state and the rest state can be switched by means of exclusive control between the vRU #1 and the vRU #2. In other words, the two digital signal processing units are controlled so that, of the two digital signal processing units (vRU #1 and vRU #2) in the O-RU 10, when one of the digital signal processing units switches from the rest state to the operational state, the other digital signal processing unit switches from the operational state to the rest state. In other words, when the state of one of the digital signal processing units is changed, the other is also controlled so that only one digital signal processing unit is in the operational state.

For example, in FIG. 7, if the vRU #2 is changed from the rest state to the operational state due to a command from the management device managing the system, then the vRU #1 is switched from the operational state to the rest state since the vRU #1 and the vRU #2 are exclusively controlled so that only one digital signal processing unit is in the operational state.

(2) Control by Switching Command

The operational state and the rest state can be switched by a switching command supplied from outside the O-RU 10 to the vRU #1 or the vRU #2. In particular, the management device managing the system may supply a switching command to the vRU #1 or the vRU #2. In other words, when the management device supplies a switching command for putting the vRU #1 in the operational state from outside the O-RU 10, the vRU #1 switches to the operational state even if it was in the rest state. Additionally, when the management device supplies a switching command for putting the vRU #1 in the rest state from outside the O-RU 10, the vRU #1 switches to the rest state even if it was in the operational state.

For the vRU #2 as well, the vRU #2 can be switched between the operational state and the rest state by supplying, from outside the O-RU 10, a switching command for switching to the operational state or a switching command for switching to the rest state.

Furthermore, control by exclusive control and by switching commands can be combined. For example, in FIG. 7, exclusive control is set between the vRU #1 and the vRU #2. In this case, if the vRU #2 changes from the rest state to the operational state due to a switching command from the management device, then the vRU #1 switches from the operational state to the rest state even without receiving a switching command from the management device because the vRU #1 and the vRU #2 are under exclusive control.

(3) Mutual Control

The operational state and the rest state can be switched by means of mutual control between the vRU #1 and the vRU #2. In other words, the vRU #1 and the vRU #2 can control switching between the operational state and the rest state in accordance with their mutual relationship without particularly receiving switching commands from the outside regarding whether they should respectively be in the operational state or the rest state, and without using exclusive control.

In particular, the vRU #1 and the vRU #2 are provided with a first digital signal processing program and a second digital signal processing program respectively corresponding thereto, and are operated respectively by the first and second digital signal processing programs. Under these circumstances, it is possible to switch between the operational state and the rest state based on the mutual relationship between the first digital signal processing program and the second digital signal processing program.

For example, suppose that the first digital signal processing program in the vRU #1 is an old version of a certain digital signal processing program and the second digital signal processing program in the vRU #2 is a new version of the same digital signal processing program. In that case, due to mutual control between the vRU #1 and the vRU #2, even if a switching command is not received from the outside, the vRU #2 operating under the new version can be put in the operational state and the vRU #1 operating under the old version can be put in the rest state.

In FIG. 7, the baseband unit 110 in the O-RU 10 includes two vRUs communicably connected to respectively corresponding DUs. However, more generally, the baseband unit in the O-RU 10 may include N (N being equal to or greater than 2) digital signal processing units (vRUs) and may communicably connect with respectively corresponding higher-level units.

In that case, in the baseband unit, some of the N vRUs may be made to execute digital signal processing, and the vRUs in which digital signal processing is executed may be switched. In other words, it is possible to switch between which vRUs are to be made to execute digital signal processing.

Furthermore, the three methods, namely, (1) exclusive control, (2) control by switching commands and (3) mutual control, may be used for these switches.

Figure 8:
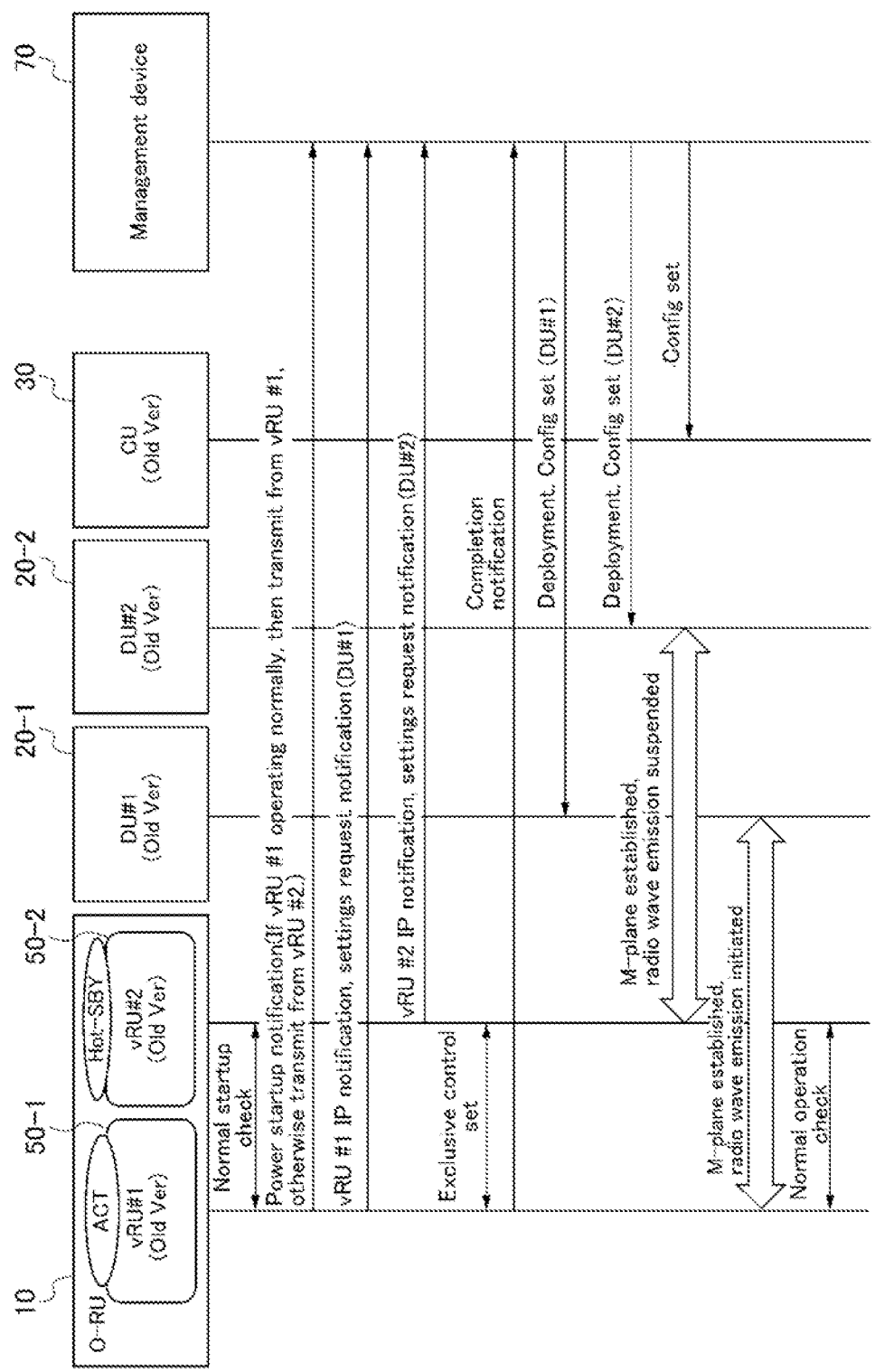
FIG. 8 is a schematic diagram for explaining a first example of the operations in an O-RU and an O-RU management method according to an embodiment in the present disclosure.

FIG. 8 is a schematic diagram for explaining a first example of the operations in an O-RU and the O-RU management method according to an embodiment in the present disclosure.

A first example of the operations in the O-RU and the O-RU management method according to the embodiment will be explained with reference to FIG. 8. In this example, the O-RU 10 is started and exclusive control and redundancy of digital signal processing units (vRUs) are incorporated.

FIG. 8 illustrates a system including an O-RU 10, a DU #1 (DU 20-1), a DU #2 (DU 20-2), and a CU 30. Additionally, the O-RU 10 includes a baseband unit having two virtualized digital signal processing units, namely, the vRU #1 (vRU 50-1) and the vRU #2 (vRU 50-2).

The reason there are two each of the vRUs and the DUs in FIG. 8 is for the sake of convenience of explanation, and the number thereof may be an arbitrary number equal to or greater than two.

Furthermore, FIG. 8 illustrates a management device 70 for managing the system. The management device 70 may be an Operation Support System (OSS), an Element Management System (EMS), a Network Management System (NMS), or the like.

Additionally, the position of the management device 70 is not particularly limited, and it may be configured from other elements. For example, the management device 70 may be configured in the CU 30, or may be provided in a Multi-access Edge Computing (MEC) server provided in an edge data center or a regional data center.

In the example explained in FIG. 8, the DU #1 and the DU #2 are assumed to have the same level of performance. In particular, if the DU #1 and the DU #2 are virtualized, then the software and the version thereof for realizing the DU #1 and the DU #2 are assumed to be the same. In FIG. 8, the software versions of the DU #1 and the DU #2 are both assumed to be an "old version".

Similarly, the versions of the software for realizing the two virtualized digital signal processing units (vRU #1 and vRU #2) are assumed to be the same, and to be the "old version".

The expression "old version" is merely used for convenience in referring to the same version, and does not refer to the absolute oldness of the software versions per se.

When the O-RU 10 is started by the power being switched on, receiving a startup signal, or the like, the vRU #1 and the vRU #2 in the baseband unit are also started. In particular, the vRU #1 and the vRU #2 check each other for normal startup ("Normal startup check" in FIG. 8).

The startup check in the O-RU 10 and the normal startup in the vRU #1 and the vRU #2 are transmitted to the management device 70 as power startup notifications ("Power startup notification" in FIG. 8). Which of the vRU #1 and the vRU #2 is to transmit the power startup notification can be decided on the basis of configuration information. For example, the configuration information may be indicated in a configuration file. In FIG. 8, transmission from the vRU #1 to the management device 70 is performed.

The vRU #1 transmits, to the management device 70, an IP notification indicating the IP address of the vRU #1, as well as a configuration request for connecting with a DU #1 set as a connection destination ("vRU #1 IP notification, configuration request (DU #1)" in FIG. 8). Which DU (DU #1 in the example in FIG. 8) is to be the higher-level unit to be communicably connected with the vRU #1 may be predefined as configuration information, or may be indicated in a configuration file.

Similarly, the vRU #2 transmits, to the management device 70, an IP notification indicating the IP address of the vRU #2, as well as a configuration request for connecting with a DU #2 set as a connection destination ("vRU #2 IP notification, configuration request (DU #2)" in FIG. 8). The vRU #2 may also communicably connect with the DU #2 on the basis of the configuration information.

Exclusive control is set for the vRU #1 and the vRU #2 ("Exclusive control set" in FIG. 8). In other words, as mentioned above, of the vRU #1 and the vRU #2 in the O-RU 10, the two digital signal processing units are controlled so that only one digital signal processing unit is in the operational state.

At this time, which of the vRU #1 and the vRU #2 is to be put in the operational state may be based on the order of startup, or may be based on configuration information that is indicated in a configuration file or the like. In FIG. 8, the vRU #1 is assumed to be in the operational state (ACT) and the vRU #2 is assumed to be in the rest state (SBY).

When exclusive control is set, a completion notification is transmitted to the management device 70 ("Completion notification" in FIG. 8). As with the power startup notification, whether to transmit the completion notification from the vRU #1 or from the vRU #2 can be decided on the basis of the configuration information. In FIG. 8, the completion notification is assumed to be transmitted from the vRU #1 to the management device 70.

Upon receiving the completion notification, the management device 70 deploys the DU #1 on an NFVI based on the configuration request from the vRU #1. In particular, the DU #1 and the vRU #1 are communicably connected and the DU #1 is made to set up a connection with the vRU #1 ("Deployment, Config set (DU #1)" in FIG. 8).

Additionally, the management device 70 deploys the DU #2 on the NFVI based on the configuration request from the vRU #2. In particular, the DU #2 and the vRU #2 are communicably connected and the DU #2 is made to set up a connection with the vRU #2 ("Deployment, Config set (DU #2)" in FIG. 8).

Furthermore, the management device 70 notifies the CU 30 of the connection between the DU #1 and the vRU #1 (this connection is also a connection between the DU #1 and the O-RU 10) and of the connection between the DU #2 and the vRU #2 (this connection is also a connection between the DU #2 and the O-RU 10), and makes the CU 30 set up the connections with the DU #1 and the DU #2 ("Config set" in FIG. 8).

As a result thereof, a radio access network is configured so as to include a first communication processing configuration composed of the CU 30, the DU #1, and the O-RU 10, in other words, a first base station, and a second communication processing configuration composed of the CU 30, the DU #2, and the O-RU 10, in other words, a second base station.

Although the vRU #2 is in the rest state (SBY) in which digital signal processing is not performed, it is a hot standby state in which the state of connection with the DU #2 is maintained. In other words, when switched to the operational state (ACT), there is no need for starting or restarting, or for establishing a connection with the DU #2, and digital signal processing with the DU #2 can be quickly executed.

That is to say, with the vRU #2 being in the hot standby state, the second base station composed of the CU 30, the DU #2, and the O-RU 10 can be considered to be in a rest state (hot standby) with the power still remaining on.

Furthermore, an M-plane including the DU #1 and the vRU #1, and an M-plane including the DU #2 and the vRU #2 are established.

However, the vRU #1 and the vRU #2 are exclusively controlled, the vRU #1 being in the operational state (ACT) in which it performs digital signal processing and the vRU #2 being in the hot standby state (hot-SBY) in which it is connected with the DU #2 but does not perform digital signal processing. For this reason, although radio signal exchange is initiated by the DU #1 and the vRU #1 ("M-plane established, radio wave emission initiated" in FIG. 8), there is no radio wave exchange between the DU #2 and the vRU #2 ("M-plane established, radio wave emission suspended" in FIG. 8).

In this way, in the present embodiment, redundancy of the digital signal processing units can be incorporated by establishing two M-planes by switching on the power to the O-RU 10 and making only one of the vRUs perform digital signal processing and initiate radio wave emission.

The vRU #1 and the vRU #2 can check each other regarding the establishment of an M-plane and the initiation of radio wave emission or the suspension of radio wave emission ("Normal operation check" in FIG. 8).

Figure 9:
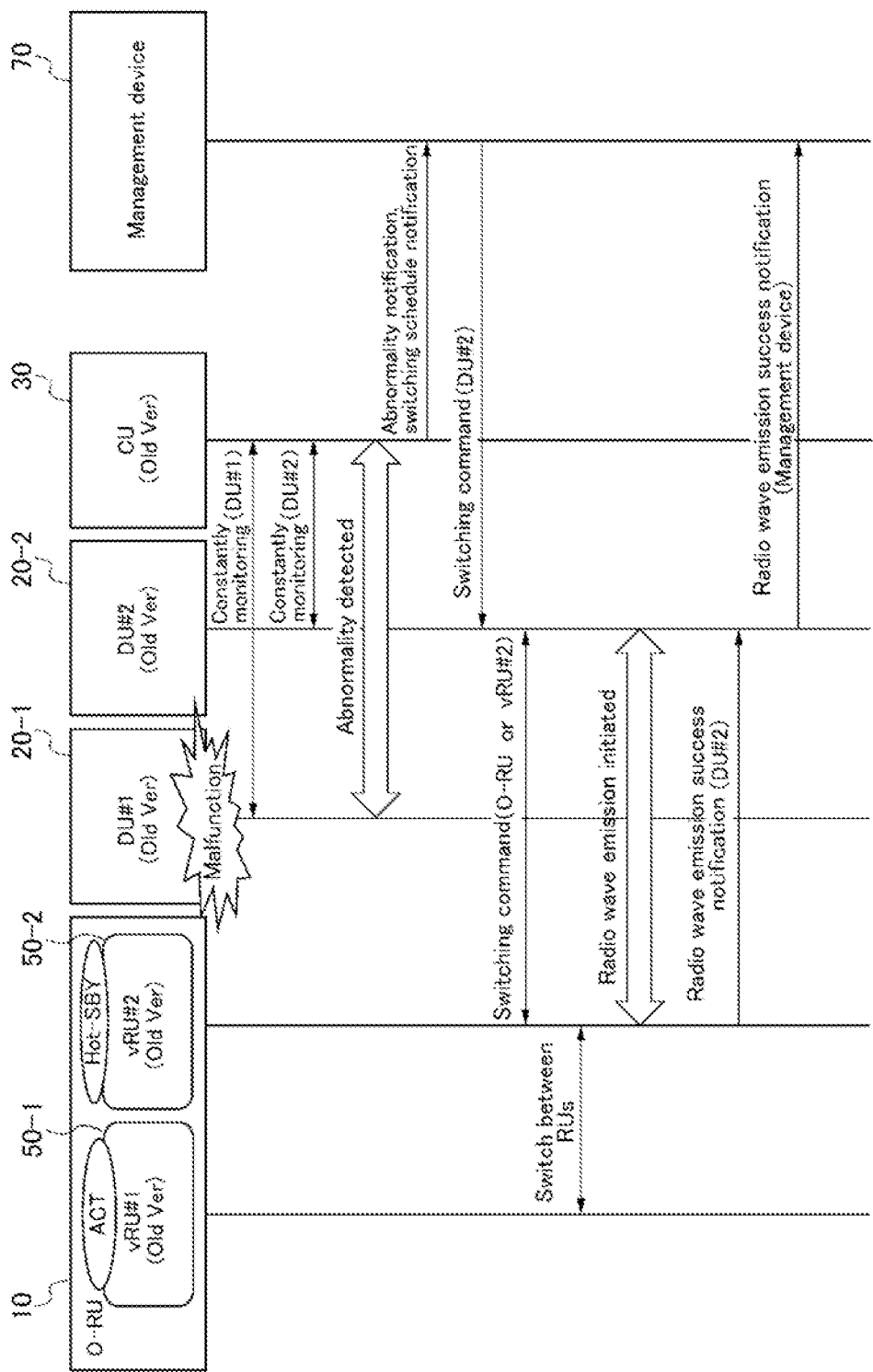
FIG. 9 is a schematic diagram for explaining a second example of the operations in an O-RU and an O-RU management method according to an embodiment in the present disclosure.

FIG. 9 is a schematic diagram for explaining a second example of the operations in an O-RU and an O-RU management method according to an embodiment in the present disclosure.

A second example of the operations in the O-RU and the O-RU management method according to the embodiment will be explained with reference to FIG. 9. In FIG. 9, for example, as in the first example illustrated in FIG. 8, redundancy of the digital signal processing units (vRU #1 and vRU #2) is incorporated. In the O-RU 10, exclusive control between the vRU #1 and the vRU #2 may be incorporated, or exclusive control may not be incorporated.

In FIG. 9, an example of a situation in which, in the O-RU 10, a malfunction has occurred in the DU #1 connected to the vRU #1, which is in the operational state (ACT), will be considered. In this case, the M-plane including the vRU #1 will cease to be established and the radio wave emission and radio wave reception by the O-RU 10 will stop. However, as will be explained next, recovery is implemented on the O-RU side by automatically switching the vRUs.

FIG. 9 illustrates a system including an O-RU 10, a DU #1 (DU 20-1), a DU #2 (DU 20-2), and a CU 30. Additionally, the O-RU 10 includes a baseband unit having two virtualized digital signal processing units, namely, the vRU #1 (vRU 50-1) and the vRU #2 (vRU 50-2).

Furthermore, as explained with reference to FIG. 8, redundancy of the digital signal processing units is incorporated into the O-RU 10 by making just one of the vRUs perform digital signal processing and initiate radio wave emission. In FIG. 9, the vRU #1 is assumed to be in the operational state (ACT), and the vRU #2 is assumed to be in the rest state (hot-SBY) in which digital signal processing is not performed while remaining communicably connected with the DU #2.

In FIG. 9 also, the reason there are two each of the vRUs and the DUs is for the sake of convenience of explanation, and the number thereof may be an arbitrary number equal to or greater than two.

If the DU #1 is normally operating, then an M-plane is established between the DU #1 and the vRU #1 that is in the operational state, and radio waves are emitted or received by the O-RU 10 by means of operations by the vRU #1. However, when a malfunction occurs in the DU #1, the M-plane is no longer established between the vRU #1 and the DU #1, and the emission and reception of radio waves by the O-RU 10 via the vRU #1 stops.

Meanwhile, the CU 30 is constantly monitoring the DU #1 and the DU #2 ("Constantly monitoring (DU #1)" and "Constantly monitoring (DU #2)" in FIG. 9). For this reason, the CU 30 detects that a malfunction has occurred in the DU #1 ("Abnormality detected" in FIG. 9). Additionally, the CU 30 also detects that the DU #2 is normally operating. The management device 70 is notified of the detection by the CU 30 and the switching schedule of the DU #1 and the DU #2 ("Abnormality notification, switching schedule notification" in FIG. 9). The monitoring by the CU 30 may involve using a general network monitoring method.

The management device 70 issues, to the DU #2, a switching command for the DU #1 and the DU #2 ("Switching command (DU #2)" in FIG. 9). Upon receiving the switching command from the management device 70, the DU #2 issues, to the O-RU 10, a switching command for switching the states of the vRU #1 and the vRU #2 ("Switching command (O-RU or vRU #2)" in FIG. 9).

When the O-RU 10 receives the switching command, the digital signal switching unit that executes the digital signal processing with the connecting DU is switched ("Switch between RUs" in FIG. 9).

In other words, the vRU #1, which was in the operational state (ACT), is switched to the rest state (SBY). If the communicable connection between the vRU #1 and the DU #1 is maintained, then the state is a hot standby state, whereas if the malfunction causes the communicable connection between the vRU #1 and the DU #1 to be lost, then the state is a cold standby state.

Furthermore, the vRU #2, which was in a rest state while remaining communicably connected with the DU #2 (hot-SBY), is switched to the operational state (ACT), thereby entering a digital signal processing state.

In the case in which the vRU #1 and the vRU #2 are exclusively controlled, instead of the switching command from the DU #2 being transmitted to the O-RU 10, it may be transmitted to the vRU #2 communicably connected to the DU #2 ("Switching command (O-RU or vRU #2)" in FIG. 9). When the switching command is received, the state of the vRU #2 changes, being switched from the rest state (hot-SBY) to the operational state (ACT). Furthermore, since the vRU #1 and the vRU #2 are exclusively controlled, with the vRU #2 being switched to the operational state, the vRU #1 is switched from the operational state (ACT) to the rest state (SBY) ("Switch between RUs" in FIG. 9).

Furthermore, when the vRU #2 enters the operational state, an M-plane is established between the DU #2 and the vRU #2. Thus, radio wave emission, which had been suspended, is initiated ("Radio wave emission initiated" in FIG. 9).

Upon confirming that radio wave emission has been initiated, the vRU #2 transmits a radio wave emission success notification to the DU #2 ("Radio wave emission success notification (DU #2)" in FIG. 9). Furthermore, the DU #2 may also transmit a radio wave emission success notification to the CU 30 or the management device 70 ("Radio wave emission success notification (Management device)" in FIG. 9).

In this way, due to a switching command to the O-RU 10 or a switching command to the vRU #2, and exclusive control between the vRU #1 and the vRU #2, even if a malfunction occurs in the DU #1 and the vRU #1 that was emitting radio waves, a switch from the vRU #1 to the vRU #2 is quickly performed on the O-RU side. Then, the second base station composed of the O-RU 10, the DU #2, and the CU 30 becomes usable, and the radio access network can quickly recover.

Since the DU #1 in which the malfunction occurred is separated from the radio access network, the radio access network can recover without suspending the operation thereof. Additionally, if the DU #1 recovers, then it becomes possible to use the first base station composed of the O-RU 10, the DU #1, and the CU 30 once again, as needed, by connecting with the vRU #1, which is in the rest state.

Figure 10:
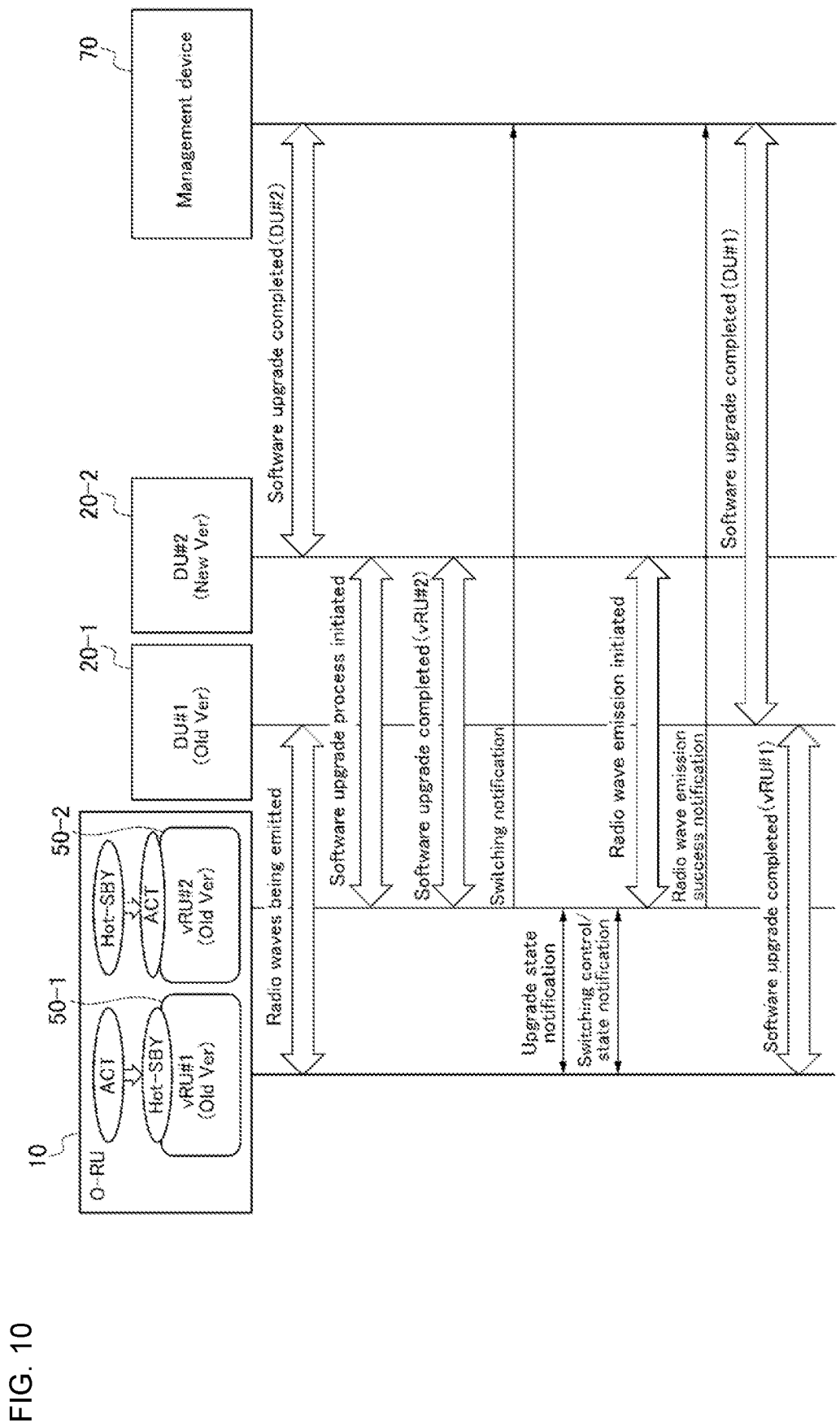
FIG. 10 is a schematic diagram for explaining a third example of the operations in an O-RU and an O-RU management method according to an embodiment in the present disclosure.

FIG. 10 is a schematic diagram for explaining a third example of the operations in an O-RU and an O-RU management method according to an embodiment in the present disclosure.

A third example of the operations in the O-RU and the O-RU management method according to the embodiment will be explained with reference to FIG. 10. In FIG. 10, for example, as in the first example, redundancy of the digital signal processing units (vRU #1 and vRU #2) is incorporated. In the O-RU 10, exclusive control between the vRU #1 and the vRU #2 may be incorporated, or exclusive control may not be incorporated.

In FIG. 10, an example of a situation in which, with a software update (software upgrade) in the DU #2, software is updated in the digital signal processing unit (vRU #2) in the O-RU 10, in which redundancy of the digital signal processing units (vRU #1 and vRU #2) is incorporated, and the states of the vRU #1 and the vRU #2 are switched will be considered.

FIG. 10 illustrates a system including an O-RU 10, a DU #1 (DU 20-1), and a DU #2 (DU 20-2). In FIG. 10, the CU is omitted. However, the CU is connected to the DU #1 and the DU #2. Additionally, the O-RU 10 includes a baseband unit having two virtualized digital signal processing units, namely, the vRU #1 (vRU 50-1) and the vRU #2 (vRU 50-2).

Furthermore, as in the first example illustrated in FIG. 8, redundancy of the digital signal processing units is incorporated into the O-RU 10 in the example in FIG. 10 by making just one of the vRUs perform digital signal processing and initiate radio wave emission. In FIG. 10, the vRU #1 is assumed to be in the operational state (ACT), and the vRU #2 is assumed to be in a rest state (hot-SBY) in which, while remaining communicably connected to the DU #2, digital signal processing is not performed.

In FIG. 10 also, the reason there are two each of the vRUs and the DUs is for the sake of convenience of explanation, and the number thereof may be an arbitrary number equal to or greater than two.

In the example explained in FIG. 10, regarding the software versions for realizing the DU #1 and the DU #2, the software version in the DU #1 is assumed to be an "old version", and the software version in the DU #2 is assumed to have been updated from the "old version" to a "new version".

In the radio access network including a first base station composed of a CU (not illustrated in FIG. 10), the DU #1, and the O-RU 10, and a second base station composed of the CU, the DU #2, and the O-RU 10, the vRU #1 is in the operational state and therefore, the first base station transmits and receives radio waves ("Radio waves being emitted" in FIG. 10).

Furthermore, the digital signal processing in the vRU #2 is in the rest state. Therefore, the software in the DU #2, communicably connected with the vRU #2, which is in the rest state, may be updated from the "old version" to the "new version" ("Software upgrade completed (DU #2)" in FIG. 10) without suspending the operations of the radio access network. The software upgrade in the DU #2 may be controlled between the management device 70 and the DU #2.

However, at the time the software in the DU #2 is updated from the "old version" to the "new version", the software versions for realizing the two virtualized digital signal processing units (vRU #1, vRU #2) are assumed to be the same, both being the "old version".

With the software upgrade in the DU #2, the software in the vRU #2 communicably connected therewith may sometimes require an update as well. Therefore, the DU #2 makes the vRU #2 initiate a software upgrade process ("Software upgrade process initiated" in FIG. 10).

At this time, although the vRU #2 is communicably connected with the DU #2, it is in the rest state in terms of digital signal processing (hot-SBY).

Thus, even if the vRU #2 is stopped or the like as the vRU #2 undergoes the software upgrade, digital signal processing continues in the vRU #1. Therefore, since the first base station composed of the CU, the DU #1, and the O-RU #1 is in the operational state, the operations as a radio access network are maintained.

The DU #2 is notified of completion of the software upgrade process in the vRU #2 ("Software upgrade completed (vRU #2)" in FIG. 10). Completion of the software upgrade process refers to a state in which the vRU #2 has been restarted or the like in association with the software upgrade process, and the communicable connection between the vRU #2 and the DU #2 is being maintained.

In other words, the vRU #2 that has undergone the software upgrade is communicably connected with the DU #2 that has undergone the software upgrade, and is in the rest state (hot-SBY).

Furthermore, the vRU #2 in which the software upgrade process has been completed notifies the management device 70 that a switch of the operational state and the rest state should be performed with respect to the vRU #1 ("Switching notification" in FIG. 10).

Then, the vRU #1 and the vRU #2 exchange information regarding their own software states with each other, particularly the software update situations ("Upgrade state notification" in FIG. 10).

As a result thereof, the vRU #1 and the vRU #2 recognize which of the two is installed with the newer version of the software.

In accordance with the state of the digital signal processing program in each of the vRU #1 and the vRU #2, in other words, based on which software version is newer, the vRU in the operational state and the vRU in the rest state regarding digital signal processing with the DUs can be switched by means of mutual control.

In the example in FIG. 10, the software version of the vRU #1, which is in the operational state, is older, and the software version of the vRU #2, which is in the rest state, has been updated and is new. Thus, due to mutual control between the vRU #1 and the vRU #2, the vRU #2 operating under the new version is switched to the operational state, and the vRU #1 operating under the old version is switched to the rest state ("Switching control/state notification" in FIG. 10).

Then, the vRU #1 and the vRU #2 notify each other of the states thereof (whether in the operational state or in the rest state) ("Switching control/state notification" in FIG. 10).

Figure 11:
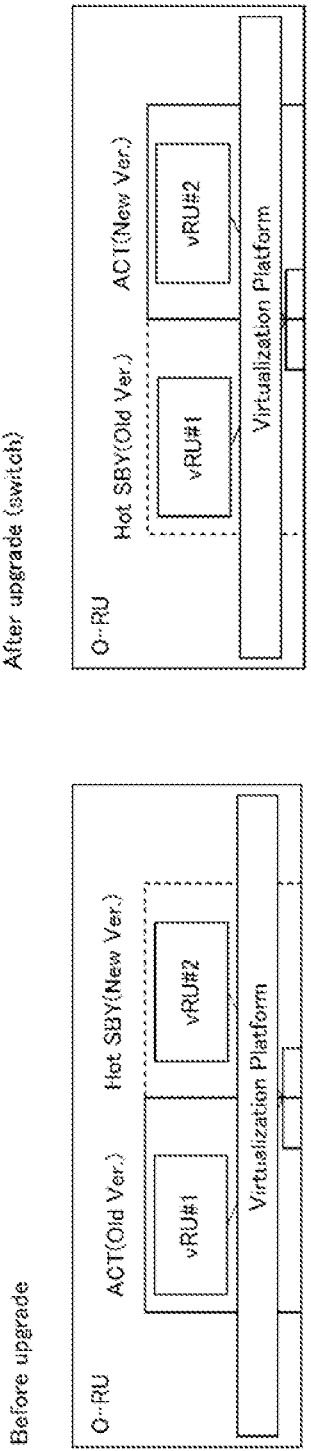
FIG. 11 is a schematic diagram for explaining an example of the operations in an O-RU according to an embodiment in the present disclosure.

FIG. 11 is a schematic diagram for explaining an example of the operations in an O-RU according to an embodiment in the present disclosure.

Referring to FIG. 11, an O-RU before an upgrade has a vRU #1, which is running an old version of software and which is in the operational state (ACT), and a vRU #2, which is running a new version of software and which is in the rest state (hot SBY). In addition, the O-RU 10 before the upgrade has a vRU #1, which is running an old version of software and which is in the rest state (hot SBY), and a vRU #2, which is running a new version of software and which is in the operational state (ACT).

The O-RU 10 before the upgrade and the O-RU 10 after the upgrade are in states respectively before and after switching the vRU #2, which is operating under the new version, to the operational state, and switching the vRU #1, which is operating under the old version, to the rest state ("Switching control/state notification" in FIG. 10).

In other words, the O-RU 10 is upgraded by switching the vRU #2 which operates under the new version, from the rest state (hot SBY) to the operational state (ACT), as in FIG. 11.

The procedure returns to the situation, in FIG. 10, in which the vRU #2, which is operating under the new version, is switched to the operational state (ACT) and the vRU #1, which is operating under the old version, is switched to the rest state (hot SBY).

Although an M-plane is established between the vRU #1 and the DU #1, the vRU #1 has been switched to the rest state in which digital signal processing is not performed. Thus, radio wave emission from the DU #1 to the vRU #1 is suspended.

Meanwhile, an M-plane is established between the vRU #2 and the DU #2, and the vRU #2 is switched to the operational state in which digital signal processing is performed. Thus, the emission and reception of radio waves from the DU #2 to the vRU #2 is initiated ("Radio wave emission initiated" in FIG. 10).

Furthermore, when the success of the radio wave emission is confirmed, the radio wave emission success notification is supplied from the vRU #2 to the management device 70 ("Radio wave emission success notification" in FIG. 10).

When the radio wave emission success notification is issued, this means that radio wave emission by the DU #2 and the vRU #2, in which the software has been upgraded, has been confirmed. Thus, it can be understood that the software upgrade has been completed between the management device 70, the DU #2, and the vRU #2.

Additionally, it is desirable to perform a software upgrade in the DU #1 and the vRU #1 in addition to the DU #2 and the vRU #2.

When the radio wave emission success notification is supplied from the vRU #2 to the management device 70, the vRU #1 is in the hot standby state. Therefore, as with the DU #2, the software in the DU #1 is also upgraded ("Software upgrade completed (DU #1)" in FIG. 10) and the software in the vRU #1 connecting therewith is also upgraded ("Software upgrade completed (vRU #1)" in FIG. 10).

In this way, by mutual control between the vRU #1 and the vRU #2, the software in the DUs and the vRUs can be quickly updated without substantially suspending the operations as a radio access network. The suspension of operation in the radio access network associated with updating is short (on the order of milliseconds) and is associated with switching control between the vRU #1 and the vRU #2.

In contrast therewith, in conventional updates that include restarting of the O-RUs, the restarting at the time of the upgrade typically results in a few tens of minutes of off-the-air time. Thus, the off-the-air time is largely reduced during the software update.

Additionally, due to the mutual control between the vRU #1 and the vRU #2, when the software update in vRU #2 is completed, the vRU #2 operating under the new version can be switched to the operational state and the vRU #1 operating under the old version can be switched to the rest state (switching control), as in FIG. 11, automatically and without delay, even in the absence of any special instructions from outside the O-RU 10.

In FIG. 10, the updating of the software in the vRUs triggered by the updating of the software in the DU #2 was explained. However, the software update on the DU side is not essential. For example, even if the software versions in the DU #1 and the DU #2 are the same, when the vRU #2, which is in the hot standby state, is commanded by the management device 70 or the DU #2 to perform a software upgrade process, the software in the vRU #2 can be updated, and under mutual control, the vRU #2 that operates under the new version can be switched to the operational state and the vRU #1 that operates under the old version can be switched to the rest state.

Figure 12:
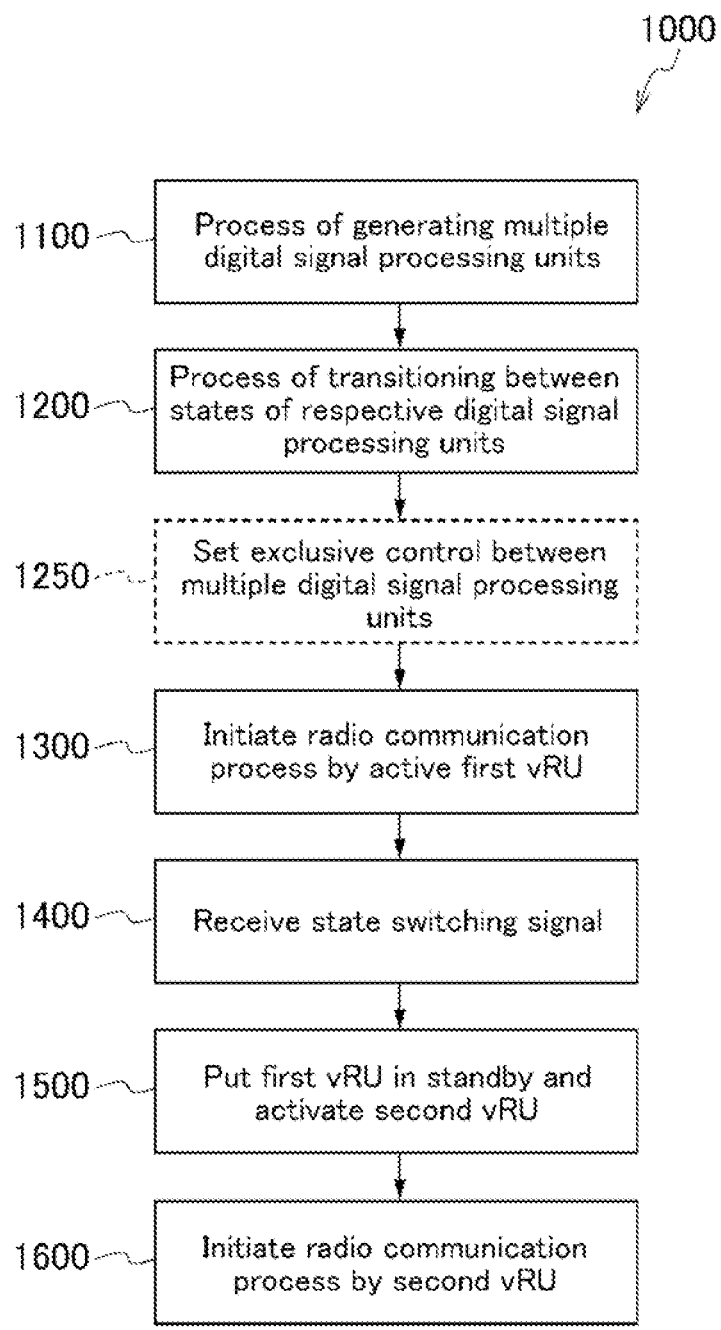
FIG. 12 is a flow chart illustrating an example of an O-RU management method according to an embodiment in the present disclosure.

FIG. 12 is a flow chart indicating an example of an Open Radio Access Network Radio Unit (O-RU) management method 1000 according to an embodiment in the present disclosure.

First, the O-RU that is to be managed will be explained. The O-RU is compliant with O-RAN fronthaul specifications as illustrated, for example, in FIG. 1 and FIG. 2. The O-RU includes a Radio Frequency (RF) unit for performing analog signal processing, and a baseband unit for performing digital signal processing, as illustrated, for example, in FIG. 3.

The O-RU, in accordance with Split Option 7-2x, may perform some of the digital signal processing (low-PHY) in the physical layer in addition to the analog signal processing (RF) such as D/A conversion or A/D conversion and analog beam forming (FIG. 4).

The O-RU that is managed includes multiple digital signal processing units (in FIG. 12, these are also indicated as the first vRU and the second vRU) in the baseband unit. The multiple digital signal processing units (vRUs) are configured to execute digital signal processing with respectively defined higher-level units. The higher-level units may be DUs, and may, in particular, be virtualized DUs.

The baseband unit is configured so as to be able to make some of the multiple digital signal processing units execute digital signal processing. The digital signal processing units that are made to execute digital signal processing are referred to as being in the operational state (indicated as "active" in FIG. 12), and the digital signal processing units that are not made to execute digital signal processing are referred to as being in the rest state (indicated as "standby" in FIG. 12).

The explanation will return to that of a management method 1000 referring to FIG. 12.

The management method 1000 includes a process of generating multiple digital signal processing units on the virtualization infrastructure of the O-RU (1100 in FIG. 12). The process of generating multiple digital signal processing units may be performed by the O-RU when the O-RU is started by the power being switched on, by receiving a startup signal, or the like.

The management method 1000 includes a process of transitioning between states of the respective digital signal processing units (1200 in FIG. 12).

As mentioned above, the respective digital signal processing units are in an operational state in which they can be made to execute digital signal processing or in a rest state in which they cannot be made to execute digital signal processing.

When the state transition process is performed on the respective digital signal processing units (1200 in FIG. 12), only one of the digital signal processing units among the multiple digital signal processing units is switched to the operational state, and the other digital signal processing units are switched to the rest state.

For the sake of convenience of explanation, the digital signal processing unit that has been switched to the operational state is defined as the first digital signal processing unit (indicated as the "first vRU" in FIG. 12). Additionally, for the sake of convenience of explanation, a digital signal processing unit in the rest state will be defined as a second digital signal processing unit (indicated as the "second vRU" in FIG. 12). However, this is not intended to limit the number of digital signal processing units to two, and the explanation below includes cases in which the number of digital signal processing units is an arbitrary number equal to or greater than two.

The management method 1000 may further include, optionally, setting exclusive control between the multiple digital signal processing units (1250 in FIG. 12). In other words, exclusive control is set in the multiple digital signal processing units so that the number of digital signal processing units in the operational state is limited to one. Due to exclusive control, when a certain digital signal processing unit that was in the rest state is switched to the operational state, the other digital signal processing units that were in the operational state until then are switched to the rest state.

The management method 1000 includes initiating a radio communication process by the first digital signal processing unit (indicated as the "active first vRU" in FIG. 12), which is in the operational state (1300 in FIG. 12).

Each digital signal processing unit is communicably connected to a corresponding DU when in the operational state in which it can be made to execute digital signal processing.

Furthermore, the respective digital signal processing units may be communicably connected to a corresponding DU even when in the rest state in which it cannot be made to execute digital signal processing. Additionally, the respective DUs corresponding to the respective digital signal processing units are communicably connected to the CU.

The DU connected to the first digital signal processing unit in the operational state is defined as the first DU. The O-RU performs analog signal processing and low-PHY by means of an antenna (see, for example, 130 in FIG. 3), an RF unit (see, for example, 120 in FIG. 3), and the first digital signal processing unit, which is in the operational state. Thus, the O-RU is in a state of being able to function as a first base station together with the CU and the first DU.

In this way, in the first base station, a radio communication process by the first digital signal processing unit, which is in the operational state, is initiated in addition to exchanging radio waves (1300 in FIG. 12).

The management method 1000 includes receiving a state switching signal (1400 in FIG. 12).

A state switching signal is a signal for switching between the operational state and the rest state for at least some of the multiple digital signal processing units. For example, if both the first digital signal processing unit, which is in the operational state, and the second digital signal processing unit, which is in the rest state, receive state switching signals, then the first digital signal processing unit switches to the rest state and the second digital signal processing unit switches to the operational state.

Alternatively, if the second digital signal processing unit receives a state switching signal, then the second digital signal processing unit switches to the operational state. In this case, if exclusive control is assumed to be set between the first and second digital signal processing units (1250 in FIG. 12), then even if the first digital signal processing unit does not receive a state switching signal, the first digital signal processing unit is switched to the rest state due to exclusive control.

In this way, the management method 1000 includes switching between the operational state and the rest state (indicated as "Put first vRU in standby and activate second vRU", denoted by reference number 1500, in FIG. 12) for at least some of the multiple digital signal processing units.

Suppose that the operational state and the rest state have been switched for at least some of the multiple digital signal processing units, thereby putting, in the operational state, a digital signal processing unit different from that before the state switching signal was received. In this case, before the state switching signal was received, the first digital signal processing unit was in the operational state, and after the state switching signal was received, the second digital signal processing unit, which is different from the first digital signal processing unit, was switched to the operational state.

The management method 1000 includes initiating a radio communication process by the second digital signal processing unit (indicated as "second vRU" in FIG. 12), which is in the operational state (1600 in FIG. 12).

The digital signal that was switched to the operational state is communicably connected to a corresponding DU. In particular, if all of the digital signal processing units remain communicably connected to the corresponding DUs before and after the switch between the operational state and the rest state, regardless of whether they are in the operational state or in the rest state, then the radio communication process by the second digital signal processing unit can be initiated more quickly.

The DU connecting with the second digital signal processing unit in the operational state is defined as the second DU. The O-RU performs analog signal processing and low-PHY by means of an antenna (see, for example, 130 in FIG. 3), an RF unit (see, for example, 120 in FIG. 3), and the second digital signal processing unit, which is in the operational state. Thus, the O-RU is in a state of being able to function as a second base station together with the CU and the second DU.

Then, in the second base station, a radio communication process by the second digital signal processing unit, which is in the operational state, is initiated in addition to exchanging radio waves (1600 in FIG. 12).

In this way, with the management method in the present disclosure, redundancy is incorporated by making only one of the digital signal processing units, which is switchable, perform digital signal processing and initiate radio wave emission.

Furthermore, a management program for making a management device execute the above-described management method is also included in the present disclosure. The management program may be provided by being recorded on a computer-readable non-transitory storage medium.

As explained above, according to the respective embodiments in the present disclosure, respective digital signal processing units can be switched between the operational state and the rest state.

The present disclosure is not limited to the embodiments described above, and various modified examples in which constituent elements have been added, deleted or replaced with respect to the above-described configurations are considered to be included.

The expression "connect" used in the present description refers to a logical connection for the purpose of communication. For example, "an RU connected to a vDU" refers to the vDU and the RU being logically connected so as to be communicable. There is no need for the vDU and the RU to be directly connected in a physical manner, with a physical cable or the like, and there may be multiple devices and radio communications between the vDU and the RU.

REFERENCE SIGNS LIST

1 Radio access network
10 RU, O-RU
20 DU, O-DU
25 NMS
30 CU, O-CU
40 UPF or MEC
50 Digital signal processing unit (vRU)
70 Management device
110 Baseband unit
120 RF unit
130 Antenna
140 Generation unit

The invention claimed is:

1. An Open Radio Access Network Radio Unit (O-RU) comprising:
   a Radio Frequency (RF) unit; and
   a baseband unit, wherein:
      the baseband unit includes two or more digital signal processing units;
      the digital signal processing units are configured to execute digital signal processing with respectively defined higher-level units; and
      the baseband unit is configured to put some of the digital signal processing units in an operational state to execute the digital signal processing, put other some of the digital signal processing units in a rest state not to execute the digital signal processing and switch the digital signal processing units between the operational state and the rest state.

2. The O-RU according to claim 1, wherein the respective digital signal processing units are kept in a state of being communicably connected to the respectively defined higher-level units.

3. The O-RU according to claim 1, wherein the respective digital signal processing units are connected to the same RF unit.

4. The O-RU according to claim 1, wherein, even if the digital signal processing units that are in the operational state are switched, signals processed by the digital signal processing units are transmitted and received by the same antenna.

5. The O-RU according to claim 1, further comprising:
   a generation unit that generates the two or more digital signal processing units in the baseband unit.

6. The O-RU according to claim 1, wherein the higher-level units are Open Radio Access Network Distributed Units (O-DUs).

7. The O-RU according to claim 1, configured so that the digital signal processing units that are in the operational state are selected based on at least configuration information.

8. The O-RU according to claim 1, configured so that states of the digital signal processing units are switched between the operational state and the rest state by exclusive control between the digital signal processing units.

9. The O-RU according to claim 1, configured so that states of the digital signal processing units are switched between the operational state and the rest state upon receiving a switching command.

10. The O-RU according to claim 1, further configured so that the respective digital signal processing units operate by respectively corresponding digital signal processing programs, and states of the digital signal processing units are switched between the operational state and the rest state based on at least a state of the digital signal processing programs.

11. An Open Radio Access Network Radio Unit (O-RU) management method comprising:
   a process of generating, on a virtualization infrastructure of an O-RU, multiple digital signal processing units configured to execute digital signal processing with respectively defined higher-level units;

a process of transitioning between states of the respective digital signal processing units so that the respective digital signal processing units are put in an operational state in which the digital signal processing can be executed or in a rest state in which the digital signal processing cannot be executed;

initiating a radio communication process of the O-RU by a first digital signal processing unit that is in the operational state among the multiple digital signal processing units;

receiving a state switching signal in the O-RU;

switching between the operational state and the rest state in the first digital signal processing unit, which responded to the receiving of the state switching signal;

switching between the operational state and the rest state in a second digital signal processing unit that is in the rest state and that is different from the first digital signal processing unit, among the multiple digital signal processing units, which responded to the receiving of the state switching signal; and initiating a radio communication process of the O-RU by the second digital signal processing unit that is in the operational state among the multiple digital signal processing units.

* * * * *